(12) United States Patent
Kim et al.

(10) Patent No.: US 11,708,108 B2
(45) Date of Patent: Jul. 25, 2023

(54) STEERING SYSTEM FOR VEHICLE

(71) Applicant: HYUNDAI MOBIS CO., LTD., Seoul (KR)

(72) Inventors: Kwang Yoon Kim, Yongin-si (KR); Suk Won Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/877,000

(22) Filed: Jul. 29, 2022

(65) Prior Publication Data
US 2023/0047248 A1   Feb. 16, 2023

(30) Foreign Application Priority Data

Aug. 11, 2021 (KR) .................. 10-2021-0105999

(51) Int. Cl.
*B62D 15/02*   (2006.01)
*B62D 3/12*   (2006.01)

(52) U.S. Cl.
CPC ........... *B62D 15/0225* (2013.01); *B62D 3/12* (2013.01)

(58) Field of Classification Search
CPC ...... B62D 15/0225; B62D 3/12; B62D 5/049; B62D 6/005; B62D 5/04; B62D 5/0454
See application file for complete search history.

(56) References Cited

U.S. PATENT DOCUMENTS

| | | | | |
|---|---|---|---|---|
| 2001/0001932 A1* | 5/2001 | Kobayashi | ............... | B62D 3/12 74/388 PS |
| 2003/0233181 A1* | 12/2003 | Colosky | ................... | G01D 3/08 180/443 |
| 2014/0034410 A1* | 2/2014 | Jackson | ................... | B62D 3/12 180/444 |
| 2014/0353071 A1* | 12/2014 | Ando | ................. | B62D 15/0225 180/445 |
| 2015/0060186 A1* | 3/2015 | Pavuk | ...................... | B62D 3/12 180/400 |
| 2016/0347361 A1* | 12/2016 | Schnug | ...................... | B62D 3/12 |
| 2017/0190359 A1* | 7/2017 | Hong | ................. | B62D 15/0225 |
| 2017/0355397 A1* | 12/2017 | Watanabe | ................ | B62D 3/12 |
| 2018/0215412 A1* | 8/2018 | Christiansen | ........ | B62D 5/0481 |
| 2019/0256142 A1* | 8/2019 | Chae | .................. | B62D 15/0225 |
| 2021/0221427 A1* | 7/2021 | Span | ..................... | B62D 5/0448 |

FOREIGN PATENT DOCUMENTS

KR  10-2008-0004177 A    4/2019
KR      20190094934 A  * 8/2019

* cited by examiner

*Primary Examiner* — Zakaria Elahmadi
(74) *Attorney, Agent, or Firm* — NSIP Law

(57) ABSTRACT

A steering system for a vehicle includes a housing section, a rack section configured to penetrate the housing section, a case section mounted in the housing section, and a sensor section, mounted in the case section, configured to engage the rack section and sense an amount of movement of the rack section while being rotated.

8 Claims, 6 Drawing Sheets

STEERING SYSTEM FOR VEHICLE

CROSS-REFERENCE TO RELATED APPLICATION

This application claims the benefit under 35 USC 119(a) of Korean Patent Application No. 10-2021-0105999, filed on Aug. 11, 2021, in the Korean Intellectual Property Office, the entire disclosure of which is incorporated herein by reference for all purposes.

BACKGROUND

1. Field

The following description relates to a steering system for a vehicle, and more particularly, to a steering system for a vehicle which improves assemblability among components, and enhances measurement accuracy.

2. Description of Related Art

Generally, an electric-motor driven steering system is configured to include a steering system extending from a steering wheel to opposite driving wheels, and an auxiliary power mechanism supplying auxiliary steering power to the steering system.

The steering system is configured to include a steering shaft, of which an upper end is connected to a steering wheel and a lower end is connected to a pinion shaft via a pair of universal joints, thereby rotating together with the steering wheel. Further, the pinion shaft is connected to a rack bar through a rack-pinion mechanism, and opposite ends of the rack bar are connected to the driving wheels through tie rods and knuckle arms.

The rack-pinion mechanism is formed in such a manner that a pinion gear formed adjacently to a lower end of the pinion shaft is mutually meshed with a rack gear formed on one side of an outer circumferential surface of the rack bar. Through the rack-pinion mechanism, rotational motion of the pinion shaft is changed into a linear motion of the rack bar. Thus, when a driver operates the steering wheel, the pinion shaft is rotated. By the rotation of the pinion shaft, the rack bar linearly moves in an axial direction. The linear motion of the rack bar steers the driving wheels through the tie rods and the knuckle arms.

Meanwhile, the auxiliary power mechanism is configured to include a torque sensor sensing steering torque applied to the steering wheel by a driver and outputting an electric signal proportional to the sensed steering torque, an electronic control unit generating a control signal on the basis of the electric signal transmitted from the torque sensor, and a motor generating auxiliary steering power on the basis of the control signal transmitted from the electronic control unit.

Therefore, the electric-motor driven steering system is formed such that the steering torque generated by the rotation of the steering wheel is transmitted to the rack bar via the rack-pinion mechanism, and such that the auxiliary steering power generated by the motor according to the generated steering torque is transmitted to the steering shaft, the pinion shaft, or the rack bar. That is, the steering torque generated by the steering system and the auxiliary steering power generated by the motor are combined to allow the rack bar to move in an axial direction.

However, the conventional electric-motor driven steering system has a complex structure because the steering shaft for steering input has to mechanically connect the steering wheel and the pinion shaft, and has a problem in that moisture flows into the connection region and causes mechanical defects. Thus, a need to improve this issue is required.

The related art of the present disclosure is disclosed in Korean Unexamined Patent Publication No. 2008-0004177 published on Jan. 9, 2008 and entitled "Steer-By-Wire Steering System of Vehicle".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a steering system for a vehicle includes a housing section, a rack section configured to penetrate the housing section, a case section mounted in the housing section, and a sensor section, mounted in the case section, configured to engage the rack section and sense an amount of movement of the rack section while being rotated.

The housing section may include a housing body part configured to pass the rack section; a housing mount part, formed on the housing body part and in which the case section is mounted; and a housing hole part, formed in the housing mount part, and in which the sensor section is disposed.

The housing section may further include a housing sealing part, disposed between the housing mount part and the case section, configured to prevent foreign materials from flowing into the housing hole part.

The case section may include a lower-case section, and an upper-case section covering the lower-case section.

The lower-case section may include a lower storage part having an open upper side; a lower support part, formed on the lower storage part, configured to support the sensor section to be rotatable; a lower opening part, formed on one side of the lower storage part, configured to communicate with the housing section to expose the sensor section; a lower enlargement part, extending from the one side of the lower storage part, configured to couple to the housing section; and a lower insertion part, formed on another side of the lower storage part, configured to receive and accommodate a connector.

The upper-case section may include an upper storage part configured to cover the lower storage part; an upper support part, formed on the upper storage part, configured to support the sensor section to be rotatable; an upper opening part, formed on one side of the upper storage part, configured to communicate with the housing section to expose the sensor section; and an upper enlargement part, extending from the one side of the upper storage part, configured to couple to the housing section.

The sensor section may include a sensing rack section, rotatably mounted on the case section, configured to rotate while engaged with the rack section; a sensing transmission section formed on the sensing rack section; one or more sensing gear sections, rotatably mounted in the case section, configured to rotate while engaged with the sensing transmission part; and a sensing board section configured to sense the sensing gear sections.

The sensing rack section may include a sensing rack shaft part rotatably mounted on the case section; and a sensing rack gear part, mounted in the sensing rack shaft part, configured to be insertable into the housing section and engage with the rack section.

When the sensing gear sections include two sensing gear sections, each of the two sensing gear sections may be configured to engage with the sensing transmission part.

When the sensing gear sections comprise two sensing gear sections, the two sensing gear sections may be configured to engage with each other, and either one of the two sensing gear sections may be configured to engage with the sensing transmission part.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
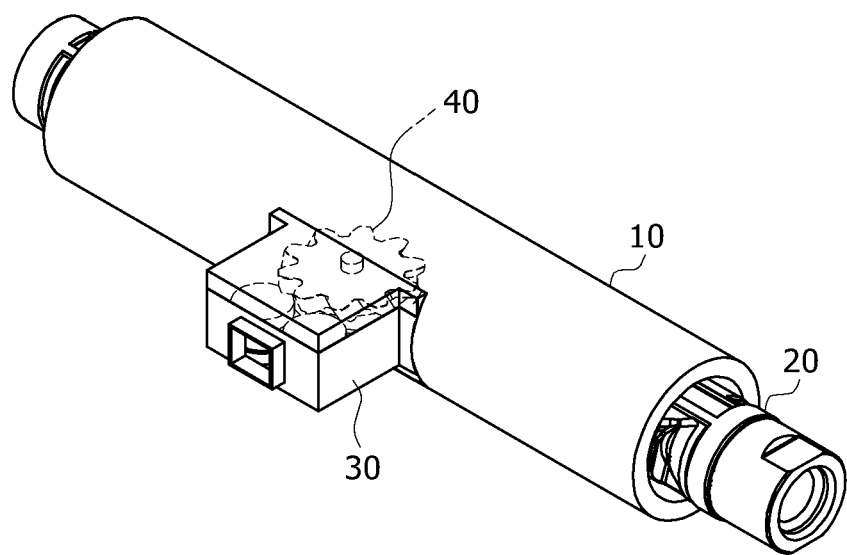
FIG. 1 is a view schematically illustrating a steering system for a vehicle according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, a steering system for a vehicle, improving assemblability among components and enhancing measurement accuracy, will be described below with reference to the accompanying drawings through various embodiments.

Hereinafter, embodiments of the steering system for a vehicle according to the present disclosure will be described with reference to the attached drawings. In this process, thicknesses of lines shown in the drawings and sizes of constituent elements may be exaggerated for clarity and convenience of description. Further, the following terms are defined in consideration of their functions in the present disclosure, and may be varied according to intentions of a user or an operator or customs. Thus, the terms should be defined based on the contents of the entire specification.

Various embodiments are directed to a steering system for a vehicle improving assemblability among components, and enhancing measurement accuracy.

In the steering system for a vehicle according to the present disclosure, the case section is attached to the housing section. It is configured such that the rack section passing through the housing section and the sensor section mounted in the case section are meshed with each other, and rotation of the sensor section is measured so that the wheel steering state can be accurately sensed by measuring the rotation of the sensor section.

FIG. 1 is a view schematically illustrating a steering system for a vehicle according to an embodiment of the present disclosure. Referring to FIG. 1, a steering system for a vehicle 1 according to an embodiment of the present disclosure includes a housing section 10, a rack section 20, a case section 30, and a sensor section 40.

The housing section 10 is provided to a vehicle body. As an example, the housing section 10 may have a cylindrical shape, and may be fixedly installed on the vehicle body. This housing section 10 may communicate with the case section 30.

The rack section 20 is inserted into the housing section 10, and is movable in an axial direction. As an example, the rack section 20 passes through the housing section 10, and is moved according to manipulation of the steering wheel disposed in front of a driver's seat so as to change angles of the wheels. The rack section 20 is geared by a driving means (not illustrated), and can be moved in an axial direction by driving of a driving means based on the manipulation of the steering wheel.

The case section 30 is mounted on the housing section 10. As an example, the case section 30 may be attached to communicate with the housing section 10.

The sensor section 40 is mounted on the case section 30, is rotated in engagement with the rack section 20, and senses an amount of movement of the rack section 20. As an example, the sensor section 40 is rotatably mounted on the case section 30, and a part thereof protrudes from the case section 30 and can be engaged with the rack section 20. The sensor section 40 and the rack section 20 can translate linear motion into rotational motion by rack and pinion coupling. The sensor section 40 can detect an amount of rotation corresponding to the amount of movement of the rack section 20. The amount of rotation measured by the sensor section 40 is transmitted to a control unit, and a rotational angle for the driving wheels can be precisely calculated.

Figure 2:
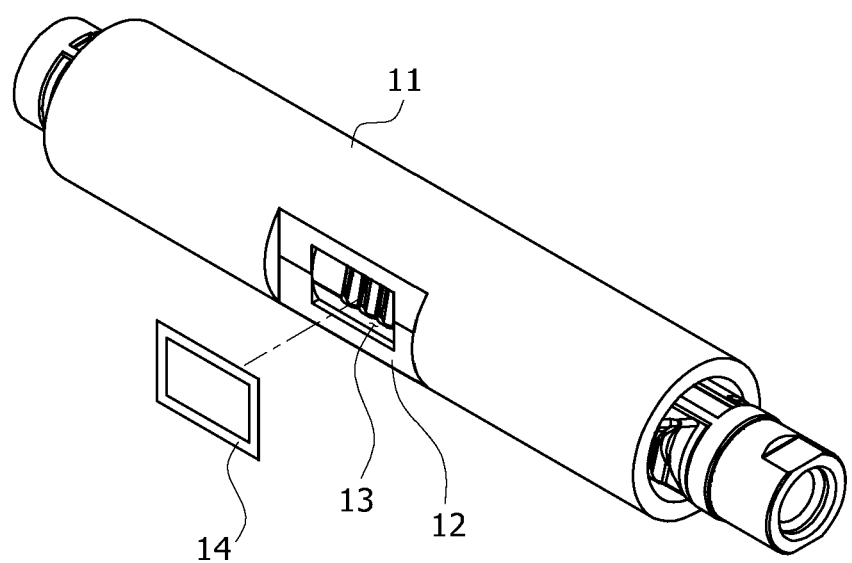
FIG. 2 is a view schematically illustrating a housing section according to an embodiment of the present disclosure.

FIG. 2 is a view schematically illustrating a housing section according to an embodiment of the present disclosure. Referring to FIG. 2, the housing section 10 according to an embodiment of the present disclosure includes a housing body part 11, a housing mount part 12, and a housing hole part 13.

The housing body part 11 may have a cylindrical shape such that the rack section 20 passes therethrough. The housing body part 11 may have an angled exterior, and may be fixed to the vehicle body by a separate fixing means.

The housing mount part 12 is formed on the housing body part 11. The case section 30 is mounted on the housing mount part 12. As an example, the housing mount part 12 may be shaped as a recess that is recessed in relation to an outer circumferential surface of the housing body part 11.

The housing hole part 13 is formed in the housing mount part 12, and the sensor section 40 is disposed in the housing hole part 13. As an example, the housing hole part 13 induces insertion of the sensor section 40, and may be a hole through which the interior of the housing body part 11 is exposed.

The housing section 10 according to an embodiment of the present disclosure may further include a housing sealing part 14. The housing sealing part 14 is disposed between the housing mount part 12 and the case section 30, and prevents foreign materials from flowing into the housing hole part 13. As an example, the housing sealing part 14 may be shaped of a rubber ring, and may be disposed to surround the housing hole part 13. In addition, the housing sealing part 14 may be formed of silicone applied between the housing body part 11 the case section 30, or a gasket coming into surface contact with the housing body part 11 and the case section 30.

Figure 3:
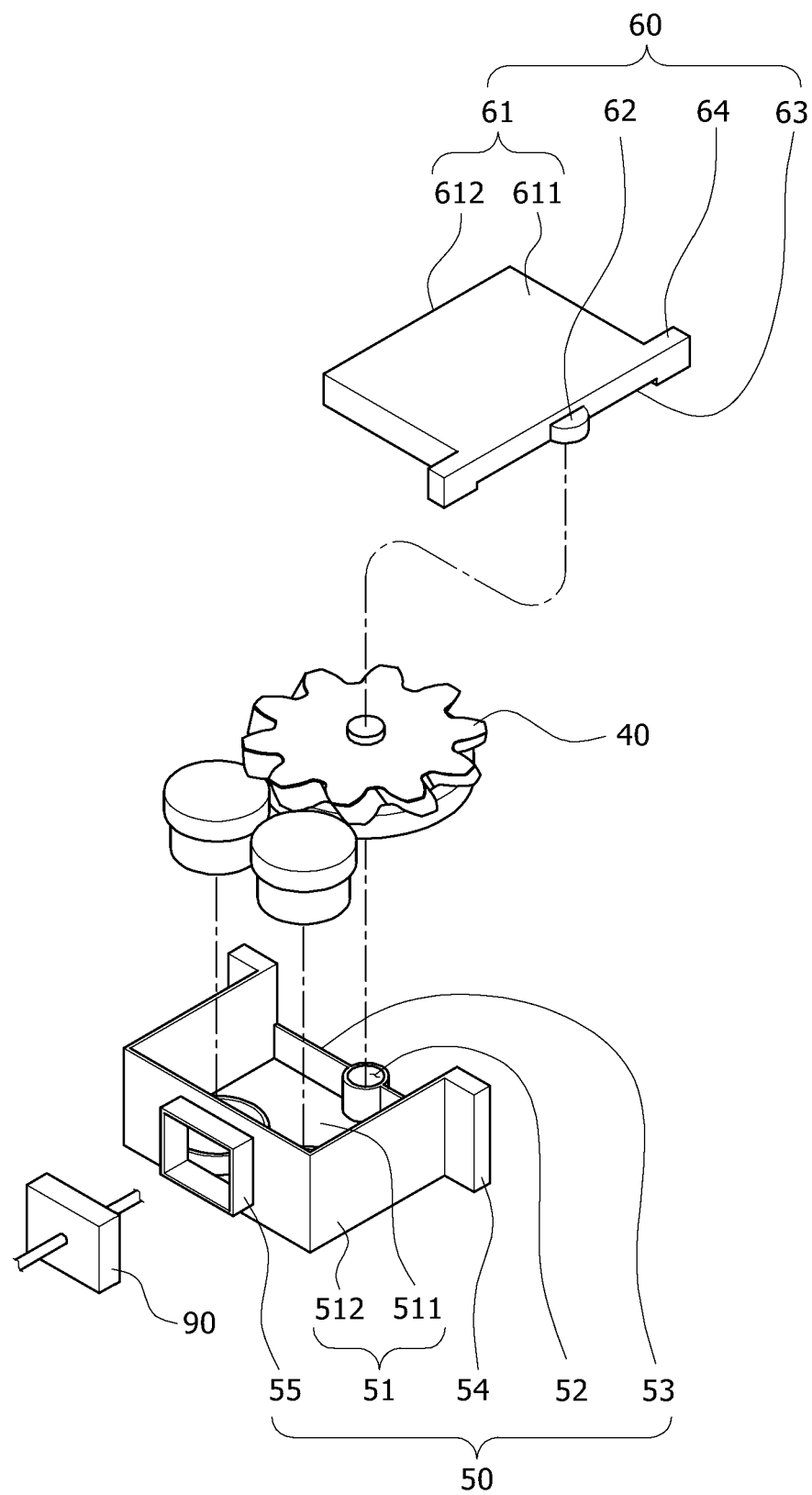
FIG. 3 is a view schematically illustrating a case section according to an embodiment of the present disclosure.

FIG. 3 is a view schematically illustrating a case section according to an embodiment of the present disclosure. Referring to FIG. 3, the case section 30 according to an embodiment of the present disclosure includes a lower case section 50 and an upper case section 60.

The lower case section 50 has a shape in which an upper side thereof is open, and the upper case section 60 covers the open portion of the lower case section 50. As an example, the lower case section 50 and the upper case section 60 can be assembled in a vertical direction. Meanwhile, an O-ring or silicone is applied to a contact region between the lower case section 50 and the upper case section 60 so as to be able to block inflow of foreign materials.

The lower case section 50 includes a lower storage part 51, a lower support part 52, a lower opening part 53, a lower enlargement part 54, and a lower insertion part 55.

The lower storage part 51 has a shape of which an upper side thereof is open. As an example, the lower storage part 51 may include a lower storage bottom part 511, and a lower storage border part 512 extending upwardly from an end of the lower storage bottom part 511.

The lower support part 52 is formed in the lower storage part 51, and supports the sensor section 40 such that the sensor section 40 is rotatable. As an example, at least one lower support part 52 is formed according to a structure of the sensor section 40, and can support rotation of the sensor section 40. In this case, the lower support part 52 may be provided with a bearing for reducing rotation resistance.

The lower opening part 53 is formed in one side of the lower storage part 51, and communicates with the housing section 10 to expose the sensor section 40. As an example, the lower opening part 53 is formed in the front of the lower storage border part 512, and may have a shape corresponding to the housing hole part 13. The lower opening part 53 is formed in a part of the front surface of the lower storage border part 512, and can come into surface contact with the housing mount part 12 so as not to interfere with the housing hole part 13. In addition, the lower storage border part 512 may be formed on sides and a rear surface of the lower storage bottom part 511, and the lower opening part 53 may be formed in a front surface of the lower storage bottom part 511.

The lower enlargement part 54 extends from one side of the lower storage part 51, and is coupled to the housing section 10. As an example, the lower enlargement part 54 extends from a front surface of the lower storage part 51 to both left and right sides of the lower storage part 51, and may contact the housing mount part 12. The lower enlargement part 54 may be attached to the housing mount part 12.

The lower insertion part 55 is formed on the other side of the lower storage part 51, and into which a connector 90 can be inserted. As an example, the lower insertion part 55 takes a shape of a duct protruding backwardly from a rear surface of the lower storage border part 512, and can induce insertion of the connector 90. The connector 90 may be connected to the sensor section 40. Meanwhile, the lower insertion part 55 may be formed at the lower storage part 51 only, or may be formed across the lower case section 50 and the upper case section 60.

The upper case section 60 according to one embodiment of the present disclosure an upper storage part 61, an upper support 62, an upper opening part 63, and an upper enlargement part 64.

The upper storage part 61 has a shape in which a lower side thereof is open. As an example, the upper storage part 61 may include an upper storage ceiling part 611, and an upper storage edge part 612 that is formed at an edge of the upper storage ceiling part 611, and extending downwardly.

The upper support 62 is formed on the upper storage part 61, and supports the sensor section 40 in a rotatable way. As an example, at least one of the upper support 62 may be formed depending on the structure of the sensor section 40, and may support rotation of the sensor section 40. In this case, the upper support 62 may be provided with a bearing for reducing resistance to rotation.

The upper opening part 63 is formed on one side of the upper storage part 61, and communicates with the housing section 10 to expose the sensor section 40. As an example, the upper opening part 63 is formed in the front of the upper storage edge part 612, and may have a shape corresponding to the housing hole part 13. The upper opening part 63 is partly formed in a front surface of the upper storage edge part 612, and may come into surface contact with the housing mount part 12 so as not to interfere with the housing hole part 13. Besides, the upper storage edge part 612 is formed on sides and a rear surface of the upper storage ceiling part 611, and the upper opening part 63 may be formed in a front surface of the upper storage ceiling part 611.

The sensor section 40 may be exposed outwardly through the upper opening part 63 and the lower opening part 53. In this case, the housing sealing part 14 may be disposed around the lower opening part 53 and the upper opening part 63.

Meanwhile, according to design, the sensor section 40 can be exposed only through any one of the lower opening part 53 and the upper opening part 63. In this structure, the other of the upper opening part 53 and the upper opening part 63 may be omitted.

The upper enlargement part 64 extends from one side of the upper storage part 61, and coupled to the housing section 10. As an example, the upper enlargement part 64 extends from a front surface of the upper storage part 61 to both left and right sides of the upper storage part 61, and may contact the housing mount part 12. The upper enlargement part 64 may be attached to the housing mount part 12.

Figure 4:
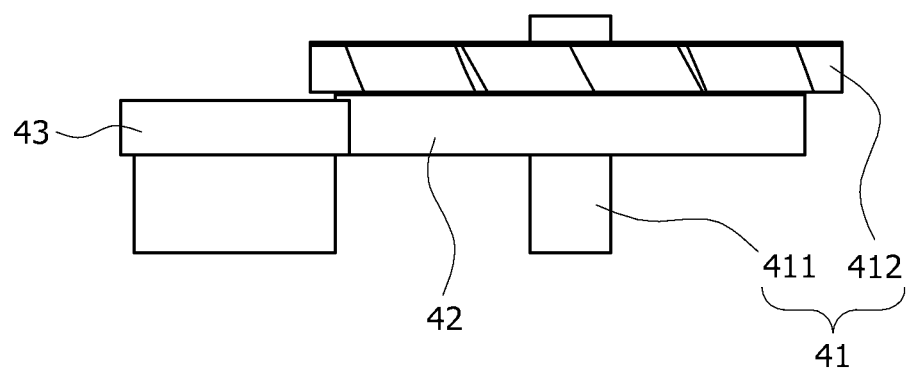
FIG. 4 is a side view schematically illustrating a sensor section according to an embodiment of the present disclosure.
Figure 5:
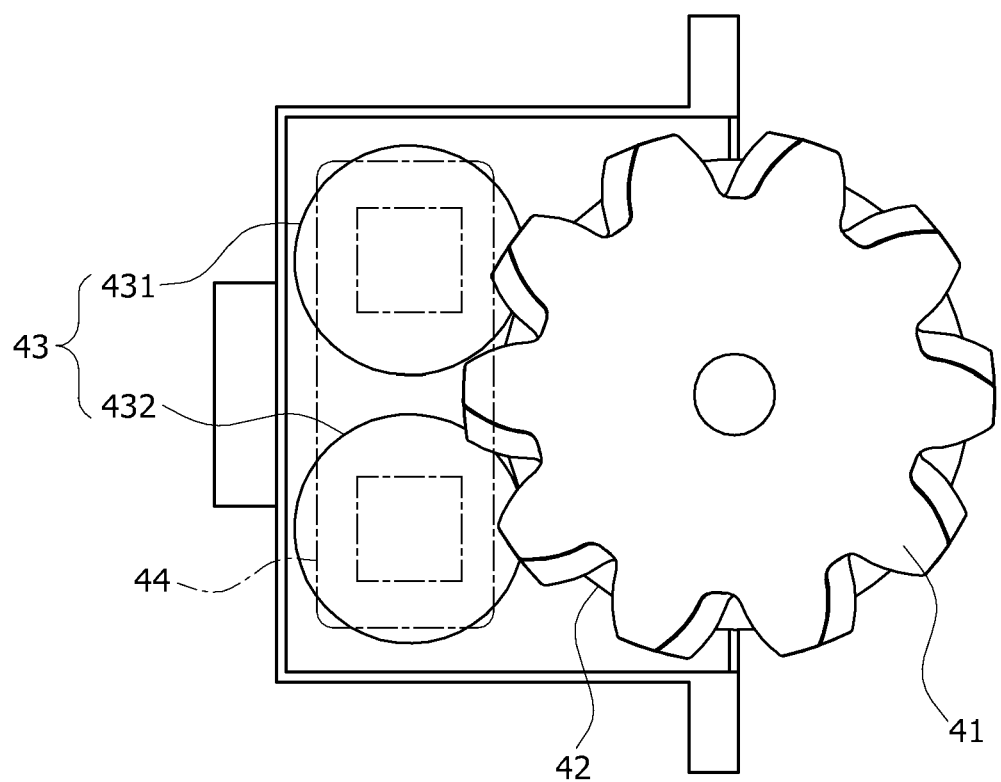
FIG. 5 is a plan view schematically illustrating a sensor section according to a first embodiment of the present disclosure.
Figure 6:
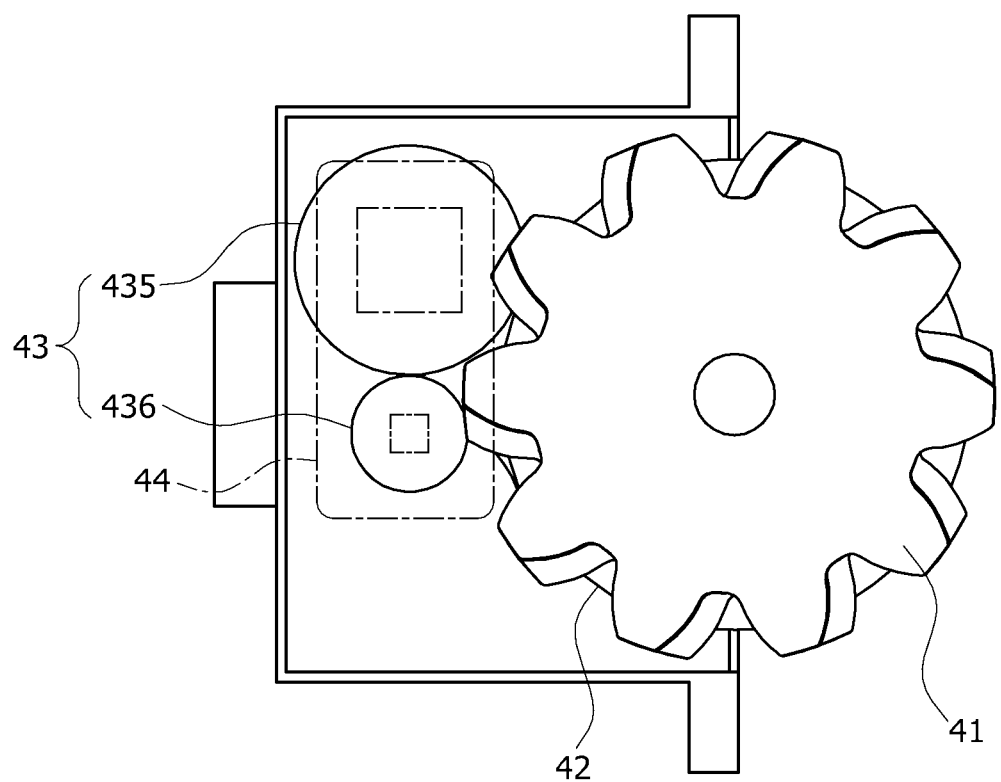
FIG. 6 is a plan view schematically illustrating a sensor section according to a second embodiment of the present disclosure.

FIG. 4 is a side view schematically illustrating a sensor section according to an embodiment of the present disclosure. FIG. 5 is a plan view schematically illustrating a sensor section according to a first embodiment of the present disclosure. FIG. 6 is a plan view schematically illustrating a sensor section according to a second embodiment of the present disclosure. Referring to FIGS. 4 to 6, the sensor section 40 according to an embodiment of the present disclosure includes a sensing rack section 41, a sensing transmission section 42, a sensing gear section 43, and a sensing board section 44.

The sensing rack section 41 is rotatably mounted on the case section 30, and is rotated while meshed with the engage rack section 20. As an example, the sensing rack section 41 may include a sensing rack shaft part 411 that is rotatably mounted on the lower support part 52 and the upper support part 62, and a sensing rack gear part 412 inserted into the housing hole part 13 through the lower opening part 53 and the upper opening part 63, and meshed with the rack section 20.

The sensing transmission section 42 is formed at the sensing rack section 41. As an example, the sensing transmission section 42 is coupled to the sensing rack shaft part 411, and may be disposed under the sensing rack gear part 412. The sensing transmission section 42 may have a spur gear shape so as to transmit turning force of the sensing rack shaft part 411.

One or more sensing gear sections 43 are rotatably mounted in the case section 30, and are rotated while meshed with the sensing transmission section 42. A magnetic body may be mounted in a rotational shaft of each sensing gear section 43. To be more specific, when the number of sensing gear sections 43 is two, the two sensing gear sections 43 may be engaged with the sensing transmission section 42 at same time (see FIG. 5). That is, a first sensing gear section 431 and a second sensing gear section 432 can be respectively rotated while meshed with the sensing gear sections 43. In this case, the first sensing gear section 431 and the second sensing gear section 432 are spaced apart from each other, and when rotated, no interference occurs. In addition, the two sensing gear sections 43 are meshed with each other, and only any one of the two sensing gear sections 43 can be meshed with the sensing transmission section 42 (see FIG. 6). That is, a fifth sensing gear section 435 and a sixth sensing gear section 436 are meshed with each other, and only the fifth sensing gear section 435 may be meshed with the sensing transmission section 42.

The sensing board section 44 senses the sensing gear section 43. As an example, the sensing board section 44 can detect magnetism of the rotating sensing gear section 43. The sensing board section 44 is disposed above the two sensing gear sections 43, is mounted on the upper case section 60, and can be connected to the connector 90.

Meanwhile, through a gear ratio combination between the sensing transmission section 42 and the sensing gear section 43, sensor output based on system requirement performance can be diversified.

The assembly and operation of the steering system for a vehicle, having the structure described above, according to an embodiment of the present disclosure will be described as follows.

The lower case section 50 and the upper case section 60 were assembled, and the sensor section 40 was mounted between the lower case section 50 and the upper case section 60. In this case, the sensing rack section 41, which was equipped with the sensing transmission section 42, and the sensing gear section 43, which was meshed with the sensing transmission section 42, were rotatably mounted on the lower support part 52 and the upper support part 62. Further, the sensing board section 44 for detecting the rotation of the sensing gear section 43 was mounted on the upper case section 60 so as be disposed above the sensing gear section 43. Meanwhile, the connector 90 brought into contact with the sensing board section 44 is discharged outwardly through the lower insertion part 55, and then connected with the control unit. In this case, a watertight member may be added in a space between the connector 90 and the sensing insertion part 55 to improve water tightness.

When the sensor section 40 is attached to the case section 30, the housing section 10 passing through the rack section 20 and the case section 30 are combined. In this case, the sensing rack section 41 is exposed from the case section 30, inserted into the housing body part 11 through the housing hole part 13, and meshed with the rack section 20.

In the above-mentioned assembly process, the case section 30 in which the sensor section 40 is mounted can be modularized and provided, and the case section 30 to which the sensor section 40 is attached can be coupled with the housing section 10. Thereby, the result leads to a product.

Meanwhile, when a vehicle needs to be steered in the state in which the assembly is completed as mentioned above, the rack section 20 is linearly moved. At this case, when the sensing rack section 41 meshed with the rack section 20 is rotated, the sensing transmission section 42 is rotated while interworking with the sensing rack section 41, and the sensing gear section 43 meshed with the sensing transmission section 42 is rotated.

When the sensing gear section 43 is rotated, the sensing board section 44 measures and transmits a rotation value of the sensing gear section 43, thereby making it possible to accurately detect a wheel steering angle.

In the steering system for a vehicle 1 according to an embodiment of the present disclosure, the case section 30 is attached to the housing section 10, the sensor section 40 mounted in the case section 30 is allowed to be meshed with the rack section 20 passing through the housing section 10, and the wheel steering state can be accurately sensed by measuring the rotation of the sensor section 40.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A steering system for a vehicle, comprising:
   a housing section;
   a rack section configured to penetrate the housing section;
   a case section mounted in the housing section; and
   a sensor section, mounted in the case section, configured to engage the rack section and sense an amount of movement of the rack section while being rotated,
   wherein the sensor section comprises:
   a sensing rack section which rotate mounted on the case section and is rotated while meshed with the rack section;
   a sensing transmission section formed on the sensing rack section;
   one or more sensing gear sections which are rotatably mounted in the case section and are rotated while meshed with the sensing transmission section; and
   a sensing board section configured to sense the sensing gear sections, and
   wherein the sensing rack section comprises:
   a sensing rack shaft part rotatably mounted on the case section; and
   a sensing rack gear part mounted in the sensing rack shaft part, inserted into the housing section, and meshed with the rack section.

2. The steering system of claim 1, wherein the housing section comprises:
   a housing body part configured to pass the rack section;
   a housing mount part, formed on the housing body part and in which the case section is mounted; and
   a housing hole part, formed in the housing mount part, and in which the sensor section is disposed.

3. The steering system of claim 2, wherein the housing section further comprises a housing sealing part, disposed between the housing mount part and the case section, configured to prevent foreign materials from flowing into the housing hole part.

4. The steering system of claim 1, wherein the case section comprises:
   a lower-case section; and
   an upper-case section covering the lower-case section.

5. The steering system according to claim 4, wherein the lower-case section comprises:
   a lower storage part having an open upper side;
   a lower support part, formed on the lower storage part, configured to support the sensor section to be rotatable;
   a lower opening part, formed on one side of the lower storage part, configured to communicate with the housing section to expose the sensor section;
   a lower enlargement part, extending from the one side of the lower storage part, configured to couple to the housing section; and
   a lower insertion part, formed on another side of the lower storage part, configured to receive and accommodate a connector.

6. The steering system of claim 5, wherein the upper-case section comprises:
   an upper storage part configured to cover the lower storage part;
   an upper support part, formed on the upper storage part, configured to support the sensor section to be rotatable;
   an upper opening part, formed on one side of the upper storage part, configured to communicate with the housing section to expose the sensor section; and
   an upper enlargement part, extending from the one side of the upper storage part, configured to couple to the housing section.

7. The steering system of claim 1, wherein, when the sensing gear sections comprise two sensing gear sections, each of the two sensing gear sections is configured to engage with the sensing transmission section.

8. The steering system of claim 1, wherein, when the sensing gear sections comprise two sensing gear sections, the two sensing gear sections are configured to engage with each other, and either one of the two sensing gear sections is configured to engage with the sensing transmission section.

\* \* \* \* \*